(12) United States Patent
Bross et al.

(10) Patent No.: US 10,839,012 B2
(45) Date of Patent: Nov. 17, 2020

(54) ADAPTABLE ADJACENCY STRUCTURE FOR QUERYING GRAPH DATA

(71) Applicant: SAP SE, Walldorf (DE)

(72) Inventors: Jan Bross, Sandhausen (DE); Romans Kasperovics, Speyer (DE); Thomas Fischer, Sandhausen (DE); Cornelia Kinder, Walldorf (DE); Marcus Paradies, Erfurt (DE)

(73) Assignee: SAP SE, Walldorf (DE)

( * ) Notice: Subject to any disclaimer, the term of this patent is extended or adjusted under 35 U.S.C. 154(b) by 223 days.

(21) Appl. No.: 15/940,570

(22) Filed: Mar. 29, 2018

(65) Prior Publication Data

US 2019/0303506 A1  Oct. 3, 2019

(51) Int. Cl.
*G06F 16/901* (2019.01)
*G06F 16/248* (2019.01)
*G06F 16/28* (2019.01)
*G06F 16/22* (2019.01)

(52) U.S. Cl.
CPC ...... *G06F 16/9024* (2019.01); *G06F 16/2282* (2019.01); *G06F 16/248* (2019.01); *G06F 16/284* (2019.01)

(58) Field of Classification Search
CPC ............. G06F 16/9027; G06F 16/9024; G06F 16/248; G06F 16/284; G06F 16/2282; G06T 11/206
USPC .................................................. 707/798, 803
See application file for complete search history.

(56) References Cited

U.S. PATENT DOCUMENTS

| | | | |
|---|---|---|---|
| 7,287,192 B1 * | 10/2007 | Engel | G06F 11/0709 714/4.1 |
| 9,405,855 B2 * | 8/2016 | Vasilyeva | G06F 16/9024 |
| 10,061,715 B2 | 8/2018 | Choi | |
| 10,387,453 B1 * | 8/2019 | Norton | G06F 16/9024 |
| 2015/0370919 A1 * | 12/2015 | Bornhoevd | G06F 16/9024 707/798 |
| 2016/0282127 A1 * | 9/2016 | Goto | G01S 5/0027 |
| 2017/0213127 A1 | 7/2017 | Duncan | |
| 2017/0228418 A1 * | 8/2017 | Levin | G06F 16/9024 |
| 2018/0218088 A1 * | 8/2018 | Fischer | G06F 16/284 |

* cited by examiner

*Primary Examiner* — Phong H Nguyen
(74) *Attorney, Agent, or Firm* — Mintz Levin Cohn Ferris Glovsky and Popeo, P.C.

(57) ABSTRACT

A method for executing a graph algorithm is provided. The method may include responding to a request from a client to execute a graph algorithm on graph data stored in a database by determining data required to execute the graph algorithm. In response to determining that a first portion of the data required to execute the graph algorithm is absent from an existing adjacency structure that includes a second portion of the data required to execute the graph algorithm, the existing adjacency structure may be modified to include the first portion of data. The graph algorithm may be executed based on the modified adjacency structure. The execution of the graph algorithm may include querying, based on the modified adjacency structure, the graph data stored in the database. Related systems and articles of manufacture, including computer program products, are also provided.

18 Claims, 6 Drawing Sheets

ADAPTABLE ADJACENCY STRUCTURE FOR QUERYING GRAPH DATA

TECHNICAL FIELD

The subject matter described herein relates generally to database processing and more specifically to querying graph data stored in a database.

BACKGROUND

A database may be configured to store data in accordance with a database schema. For example, in a graph database, data may be represented and stored using graph structures including, for example, vertices, directed edges, undirected edges, and/or the like. Notably, the graph database may store the relationships between different data items explicitly. For instance, the vertices of a graph may correspond to the individual data items stored in the graph database while the edges of the graph may define the relationships between these data items. Attributes associated with the vertices and/or the edges may provide additional properties for the data items stored in the graph database and/or the relationships that exist between different data items.

By contrast, a relational database may store the relationships between different data items implicitly, for example, by organizing the data items into one or more database tables. Each database table may store a set of data items referred to as a relation. Furthermore, the rows of the database table may hold individual data items while the columns of the database table may hold the attributes that are present in each of the data items. Meanwhile, relationships between data items residing in different database tables may be implicitly defined by cross referencing the key that is associated with each data item in the relational database. For instance, a first database table may store the keys of data items from a second database table, thereby linking data items held in two separate database tables. Alternately and/or additionally, data items from the first database table and the second database table may be linked via a third database table storing the keys of data items from both the first database table and the second database table.

SUMMARY

Systems, methods, and articles of manufacture, including computer program products, are provided for executing a graph algorithm based on an adaptable adjacency list. In one aspect, there is provided a system including at least one data processor and at least one memory. The at least one memory may store instructions that cause operations when executed by the at least one data processor. The operations may include: responding to a request from a client to execute a graph algorithm on graph data stored in a database by at least determining data required to execute the graph algorithm; in response to determining that a first portion of the data required to execute the graph algorithm is absent from an existing adjacency structure that includes a second portion of the data required to execute the graph algorithm, modifying the existing adjacency structure to include the first portion of data; and executing, based at least on the modified adjacency structure, the graph algorithm, the graph algorithm being executed by at least querying, based on the modified adjacency structure, the graph data stored in the database.

In some variations, one or more features disclosed herein including the following features can optionally be included in any feasible combination. In response to determining that no existing adjacency structures includes at least a portion of the data required to execute the graph algorithm, a new adjacency structure may be generated that includes the data required to execute the graph algorithm. The graph algorithm may be executed based at least on the new adjacency structure.

In some variations, in response to determining that the existing adjacency structure includes all of the data required to execute the graph algorithm, the graph algorithm may be executed based at least on the existing adjacency structure.

In some variations, the graph data may include a plurality of vertices. The graph data may further include one or more edges interconnecting the plurality of vertices. The database may be a relational database that includes a vertex table storing the plurality of vertices and an edge table storing the one or more edges.

In some variations, the data required to execute the graph algorithm may include incoming edges into and/or outgoing edges from each of the plurality of vertices.

In some variations, the data required to execute the graph algorithm may include one or more vertices that are connected to each of the plurality of vertices by incoming edges and/or outgoing edges.

In some variations, each vertex and/or edge may be associated with an attribute. The data required to execute the graph algorithm may include an attribute dictionary enumerating a value for the attribute associated with each vertex and/or edge.

In some variations, each vertex and/or edge may be associated with a key. The data required to execute the graph algorithm may include a dictionary mapping the key to a different key assigned to each vertex and/or edge.

In some variations, the data required to execute the graph algorithm may be determined based at least on a programming code associated with the graph algorithm.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A relational database may be configured to store graph data, for example, by storing the vertices of a graph in a vertex table and the edges of the graph in a separate edge table. The relational database may also support graph algorithms accessing the graph data including, for example, shortest path, risk propagation, minimum flow, page rank, and/or the like. In order to expedite the execution of a graph algorithm, the relational database may generate one or more secondary indices based on the graph data. For example, the relational database may execute a graph algorithm on a graph by first generating an adjacency structure (e.g., adjacency list, adjacency matrix, and/or the like) enumerating the neighboring vertices and/or edges for every vertex and/or edge within the graph. But generating the adjacency structure can consume an excessive quantity of computational resources, especially when a conventional adjacency structure may include superfluous data not required to execute the graph algorithm. As such, in some example embodiments, the relational database may generate and/or reuse, based on the data required to execute a graph algorithm, an adaptable adjacency structure for executing the graph algorithm. The generation of the adaptable adjacency structure may consume a minimized quantity of computational resources because the data not required to execute the graph algorithm may be omitted from the adaptable adjacency structure.

Figure 1:
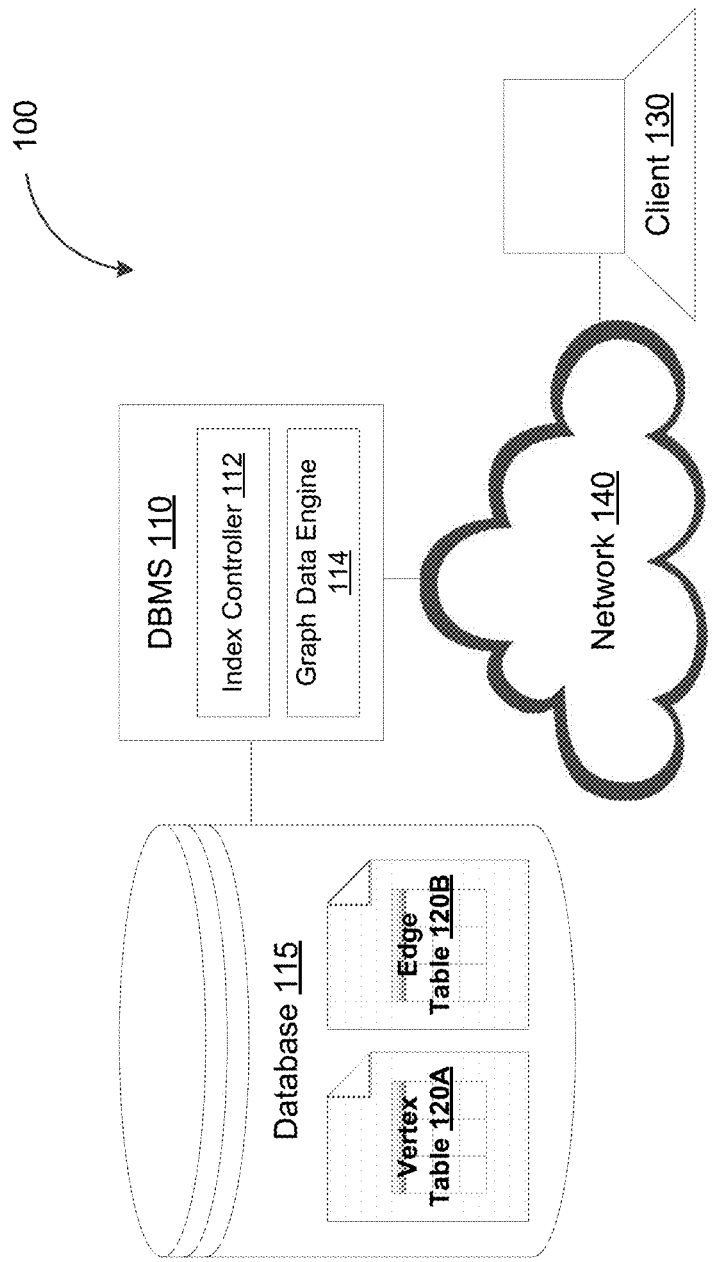
FIG. 1 depicts a system diagram illustrating a data storage system, in accordance with some example embodiments.

FIG. 1 depicts a system diagram illustrating a data storage system 100, in accordance with some example embodiments. Referring to FIG. 1, the data storage system 100 may include a database 115 storing graph data. In some example embodiments, the database 115 may be a relational database configured to store graph data, for example, in a vertex table 120A and/or an edge table 120B. However, it should be appreciated that the database 115 may be any type of database including, for example, an in-memory database, a hierarchical database, an object database, an object-relational database, a non-Structured Query Language (NoSQL) database, and/or the like. For example, instead of and/or in addition to being a relational database, the database 115 may be a graph database, a column store, a key-value store, a document store, and/or the like.

The database 115 may be coupled with a database management system 110 that includes, for example, an index controller 112 and a graph data engine 114. In some example embodiments, the database management system 110 may be configured to respond to requests from one or more clients of the data storage system 100 including, for example, a client 130. For example, as shown in FIG. 1, the client 130 may communicate with the database management system 110 via a network 140, which may be any wired and/or wireless network including, for example, a public land mobile network (PLMN), a wide area network (WAN), a local area network (LAN), a virtual local area network (VLAN), the Internet, and/or the like. The client 130 may send, to the database management system 110, a request to execute, on at least a portion of the graph data stored in the database 115, a graph algorithm including, for example, shortest path, risk propagation, minimum flow, page rank, and/or the like. As used herein, a graph algorithm may refer to any algorithm that derives a solution by operating on graph data which, as noted, may include vertices interconnected by one or more directed and/or undirected edges. It should be appreciated that the graph algorithm may be a predefined graph algorithm and/or a custom graph algorithm defined by the client 130.

In response to the request from the client 130 to execute the graph algorithm, the database management system 110, for example, the index controller 112, may generate one or more adjacency structures including, for example, an adjacency list, an adjacency matrix, and/or the like. Executing the graph algorithm may require data including, for example, forward adjacent vertices and/or edges, backward adjacent vertices and/or edges, vertex key dictionary, edge key dictionary, vertex attributes, edge attributes, and/or the like. As such, the database management system 110, for example, the index controller 112, may generate, based at least on the graph algorithm, an adaptable adjacency structure. For example, the index controller 112 may generate the adaptable adjacency structure by at least analyzing the programming code implementing the graph algorithm to identify the vertices and/or edges accessed by the graph algorithm.

According to some example embodiments, the adaptable adjacency structure may include the data required to execute the graph algorithm but may omit at least a portion of the data not required to execute the graph algorithm. The database management system 110, for example, the graph data engine 114, may execute the graph algorithm based at least the adaptable adjacency structure. For instance, the database management system 110, for example, the graph data engine 114, may execute the graph algorithm by at least querying, based at least on the adaptable adjacency structure, the graph data stored in the database 115.

Figure 2:
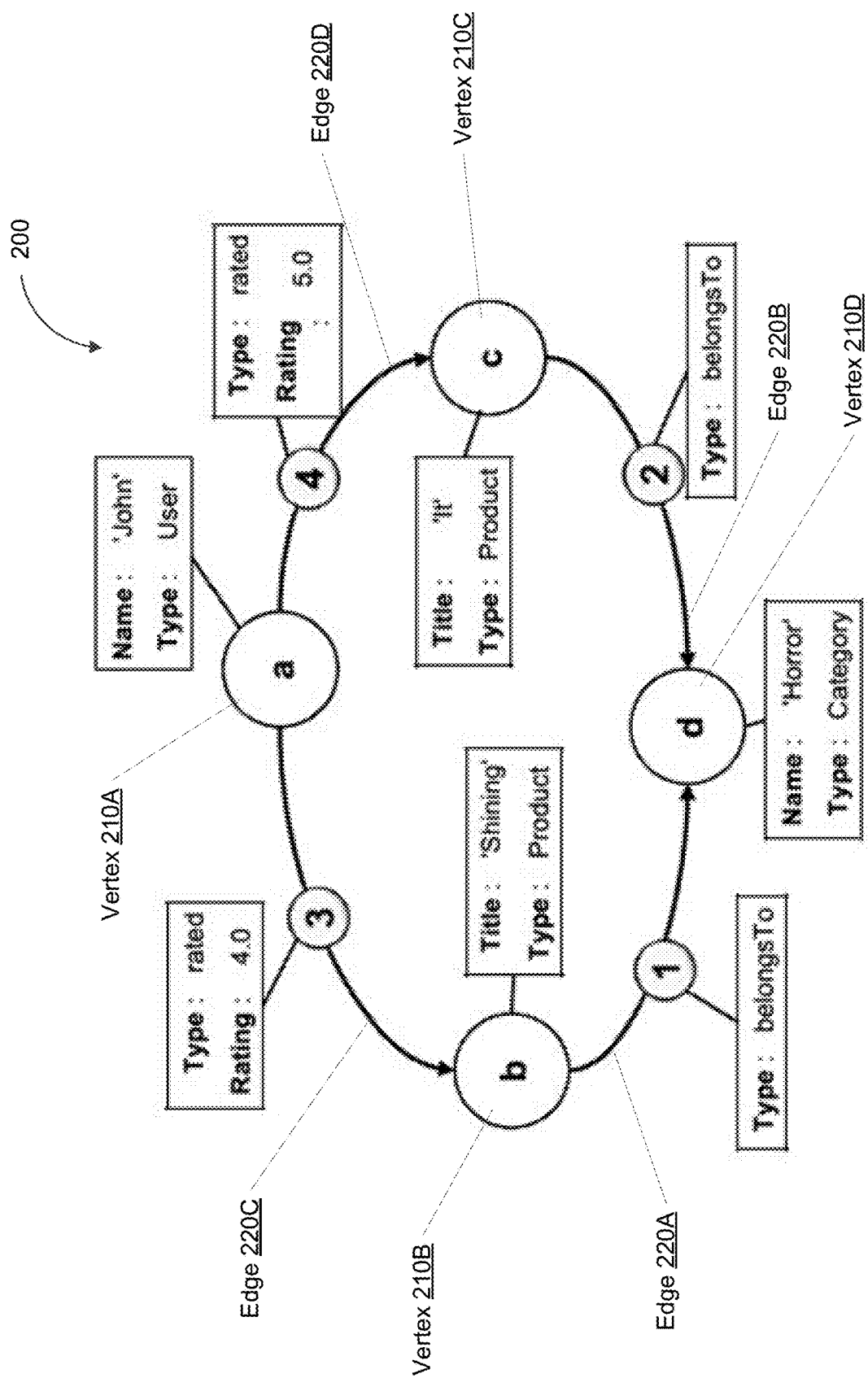
FIG. 2 depicts graph data, in accordance with some example embodiments.

To further illustrate, FIG. 2 depicts graph data 200, in accordance with some example embodiments. Referring to FIGS. 1-2, the graph data 200 may be stored in the database 115, for example, in the vertex table 120A and/or the edge table 120B. The graph data 200 may include a plurality of vertices including, for example, a first vertex 210A, a second vertex 210B, a third vertex 210C, and a fourth vertex 210D. Furthermore, the plurality of vertices may be interconnected via a plurality of directed edges including, for example, a first edge 220A, a second edge 220B, a third edge 220C, and a fourth edge 220D.

As shown in FIG. 2, each vertex and/or edge in the graph data 200 may be associated with a key that uniquely identifies the corresponding vertex and/or edge. For instance, the first vertex 210A may be associated with the key "a," the second vertex 210B may be associated with the key "b," the third vertex 210C may be associated with the key "c," and the fourth vertex 210D may be associated with the key "d." Alternatively and/or additionally, the first edge 220A may be associated with the key "1," the second edge 220B may be associated with the key "2, " the third edge 220C may be associated with the key "3," and the fourth edge 220D may be associated with the key "4." Furthermore, each vertex and/or edge in the graph data 200 may also be associated with one or more attributes. For example, each of the first vertex 210A, the second vertex 210B, the third vertex 210C, and the fourth vertex 210D may be associated with a "Title" attribute and a "Type" attribute. Meanwhile, each of the first edge 220A, the second edge 220B, the third edge 220C, and the fourth edge 220D may be associated with a "Type" attribute and/or a "Rating" attribute.

In some example embodiments, the client 130 may send, to the database management system 110, a request to execute a graph algorithm on the graph data 200. For example, the graph algorithm may be a predefined graph algorithm and/or a custom graph algorithm including, for example, shortest path, risk propagation, minimum flow, page rank, and/or the like. In response to the request to execute the graph algorithm, the database management system 110, for example, the index controller 112, may generate an adaptable adjacency structure (e.g., an adjacency list, an adjacency matrix, and/or the like) that includes the data required to execute the graph algorithm but omits at least a portion of the data not required to execute the graph algorithm. For instance, the adaptable adjacency structure can include and/or exclude forward adjacent vertices and/or edges, backward adjacent vertices and/or edges, vertex key dictionary, edge key dictionary, vertex attributes, edge attributes, and/or the like.

The database management system 110, for example, the index controller 112, may generate the adaptable adjacency structured based at least on the graph algorithm including, for example, the vertices and/or edges included in the graph data 200 accessed by the graph algorithm. According to some example embodiments, the index controller 112 may determine whether an existing adjacency structure includes at least a portion of the data required to execute the graph algorithm. An existing adjacency structure that includes all of the data required to execute the graph algorithm may be reused, for example, by the graph data engine 114, to execute the graph algorithm on the graph data 200. Alternatively and/or additionally, in the event an existing adjacency structure includes some but not all of the data required to execute the graph algorithm, the index controller 112 may modify that existing adjacency structure to include the missing data required to execute the graph algorithm. For example, the index controller 112 may determine that executing the graph algorithm may require both forward adjacent vertices and backward adjacent vertices. The index controller 112 may further determine that an existing adjacency structure includes the forward adjacent vertices but not the backward adjacent vertices. As such, the index controller 112 may modify the existing adjacency structure to include the backward adjacent vertices such that graph data engine 114 may execute, based on the modified adjacency structure, the graph algorithm on the graph data 200.

Figure 3A:
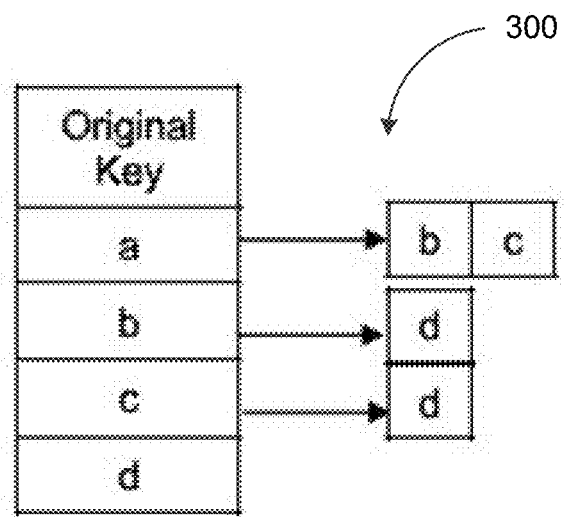
FIG. 3A depicts an adaptable adjacency structure that includes forward adjacent vertices, in accordance with some example embodiments.

As noted, the database management system 110 may respond to a request from the client 130 to execute a graph algorithm by at least generating, based on the graph data 200, an adaptable adjacency structure that includes the data required to execute the graph algorithm but omits at least some of the data not required to execute the graph algorithm. In some example embodiments, this adaptable adjacency structure may include and/or exclude forward adjacent vertices and/or edges, backward adjacent vertices and/or edges, vertex key dictionary, edge key dictionary, vertex attributes, edge attributes, and/or the like. To further illustrate, FIGS. 3A-D depicts adaptable adjacency structures that include different data required to execute a graph algorithm. For example, FIG. 3A depicts an adaptable adjacency structure 300 that includes forward adjacent vertices, in accordance with some example embodiments. As shown in FIG. 3A, the adaptable adjacency structure 300 may include a forward adjacency list that enumerates, for each vertex in the graph data 200, one or more adjacent vertices connected by an outgoing edge. For instance, according to the adaptable adjacency structure 300, the first vertex 210A associated with the key "a" may be connected to the second vertex 210B associated with the key "b" and the third vertex 210C associated with the key "c." Alternatively and/or additionally, the second vertex 210B associated with the key "b" may be connected to the fourth vertex 210D associated with the key "d."

Figure 3B:
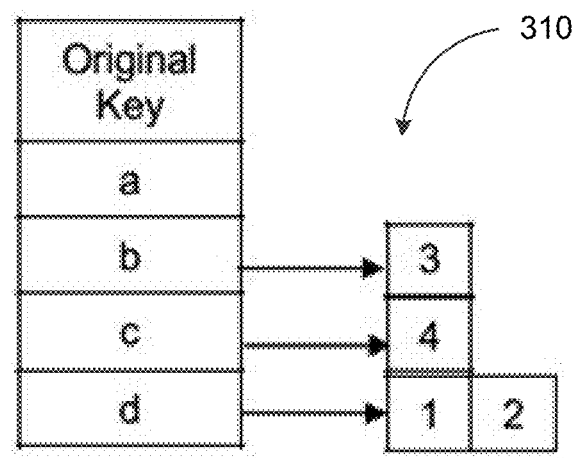
FIG. 3B depicts an adaptable adjacency structure that includes backward adjacent edges, in accordance with some example embodiments.

FIG. 3B depicts an adaptable adjacency structure 310 that includes backward adjacent edges, in accordance with some example embodiments. Referring to FIG. 3B, the adaptable adjacency structure 310 may include a backward adjacency list enumerating the outgoing edges emanating from each vertex in the graph data 200. For example, according to the adaptable adjacency structure 310, the third edge 220C associated with the key "3" may be an outgoing edge emanating from the second vertex 210B associated with the key "b" and the fourth edge 220D associated with the key "4" may be an outgoing edge emanating from the third vertex 210C associated with the key "c." Meanwhile, no outgoing edges may emanate from the first vertex 210A associated with the key "a."

Figure 3C:
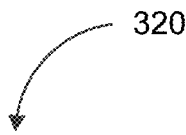
FIG. 3C depicts an adaptable adjacency structure that includes a vertex dictionary, in accordance with some example embodiments.

FIG. 3C depicts an adaptable adjacency structure 320 that includes a vertex dictionary, in accordance with some example embodiments. Referring to FIG. 3C, the vertex dictionary included in the adaptable adjacency structure 320 may include mappings between the different keys that can be assigned to each vertex in the graph data 200. For example, each vertex in the graph 200 may be assigned a different key as part of compressing the original key assigned to each vertex in the graph 200. Accordingly, as shown in FIG. 3C, the vertex dictionary included in the adaptable adjacency structure 320 may provide mappings between the alphabet key (e.g., "a," "b," "c," and "d") originally assigned to each vertex to in the graph data 200 and an integer key (e.g., "1," "2," "3," and "4'). It should be appreciated that the original keys of each vertex may be strings (e.g., full names, identification codes, and/or the like) instead of single alphabet letters, in which case the original keys may be compressed, for example, using dictionary compression.

Figure 3D:
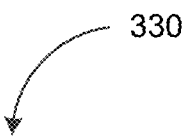
FIG. 3D depicts an adaptable adjacency structure that includes an attribute dictionary, in accordance with some example embodiments.

FIG. 3D depicts an adaptable adjacency structure 330 that includes an attribute dictionary, in accordance with some example embodiments. As shown in FIG. 3D, the attribute dictionary included in the adaptable adjacency structure 330 may enumerate the values of the attributes (e.g., "Type" and "Rating") associated with every edge in the graph data 200. For example, according to the adaptable adjacency structure 330, the "Type" attribute associated with the first edge 220A having the key "1" may have the value "belongsTo" while the "Rating" attribute associated with the first edge 220A may not have any values. Alternatively and/or additionally, the "Type" attribute associated with the third edge 220C having the key "3" may have the value "rated" and the "Ratings" attribute associated with the third edge 220C may have the value "4.0."

Figure 4:
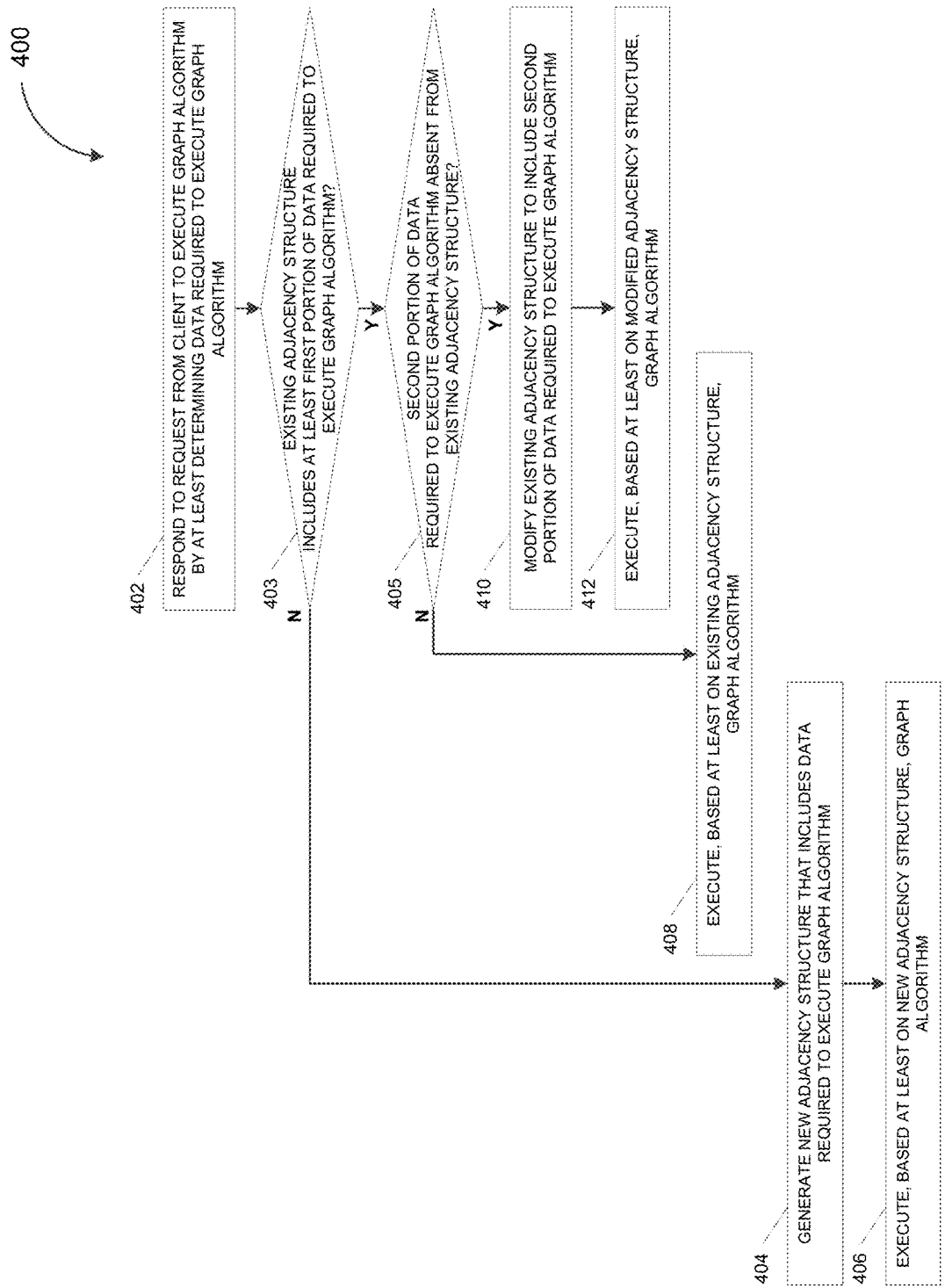
FIG. 4 depicts a flowchart illustrating a process for executing a graph algorithm, in accordance with some example embodiments.

FIG. 4 depicts a flowchart illustrating a process 400 for executing a graph algorithm, in accordance with some example embodiments. Referring to FIGS. 1-2, 3A-D, and 4, the process 400 may be performed by the database management system 110 in response to a request from the client 130 to execute a graph algorithm on graph data stored in the database 115, for example, in the vertex table 120A and/or the edge table 120B.

At 402, the database management system 110 may respond to a request from a client to execute a graph algorithm by at least determining data required to execute the graph algorithm. For example, the database management system 100 may receive, from the client 130, a request to execute a graph algorithm on the graph data 200, which may be stored in the database 115 coupled with the database management system 110. The graph algorithm may be any algorithm that derives a solution by operating on the graph data 200 including, for example, shortest path, risk propagation, minimum flow, page rank, and/or the like. As noted, the client 130 may request the database management system 110 to execute a predefined graph algorithm and/or a custom graph algorithm defined, for example, by the client 130.

At 403, the database management system 110 may determine whether an existing adjacency structure includes at least a first portion of the data required to execute the graph algorithm. In some example embodiments, the database management system 110, for example, the index controller 112, may determine the data required to execute the graph algorithm. For instance, the database management system 110 may determine the data required to execute the graph algorithm by at least analyzing the programming code implementing the graph algorithm to identify the vertices and/or edges accessed by the graph algorithm. Furthermore, the database management system 110 may determine whether an existing adjacency structure (e.g., an adjacency list, an adjacency matrix, and/or the like) includes at least a portion of the data required to execute the graph algorithm. For example, the database management system 110 may determine whether the adaptable adjacency structure 300, the adaptable adjacency structure 310, the adaptable adjacency structure 320, and/or the adaptable adjacency structure 330 include at least a portion of the data required to execute the graph algorithm including, for example, forward adjacent vertices and/or edges, backward adjacent vertices and/or edges, vertex key dictionary, edge key dictionary, vertex attributes, edge attributes, and/or the like.

The database management system 100 may, at 403-N, determine that no exiting adjacency structure includes at least the first portion of the data required to execute the graph algorithm. As such, at 404, the database management system 100 may generate a new adjacency structure that includes the data required to execute the graph algorithm.

Furthermore, at 406, the database management system 100 may execute, based at least on the new adjacency structure, the graph algorithm. For example, in some example embodiments, the database management system 110 may be unable to use any existing adjacency structures to execute the graph algorithm if no existing adjacency structures include at least a portion of the data required to execute the graph algorithm. Accordingly, the database management system 110 may generate a new adjacency structure that includes the data required to execute the graph algorithm. Furthermore, the database management system 100, for example, the graph data engine 114, may execute the graph algorithm based on this new adjacency structure.

Alternatively and/or additionally, at 403-Y, the database management system 110 may determine that an existing adjacency structure does include at least the first portion of the data required to execute the graph algorithm. As such, at 405, the database management system 110 may determine whether a second portion of the data required to execute the graph algorithm is absent from the existing adjacency structure. For example, if the database management system 110 is able to identify the adaptable adjacency structure 300, the adaptable adjacency structure 310, the adaptable adjacency structure 320, and/or the adaptable adjacency structure 330 as including at least a portion of the data required to execute the graph algorithm, the database management system 110 may further determine whether these existing adjacency structures include all of the data required to execute the graph algorithm. It should be appreciated that the database management system 110 may be able to reuse one or more existing adjacency structures without any modifications if the existing adjacency structures includes all of the data required to execute the graph algorithm.

At 405-N the database management system 110 may determine that none of the data required to execute the graph algorithm is absent from the existing adjacency structure. As such, at 408, the database management system 110 may reuse the existing adjacency structure to execute the graph algorithm based at least on the existing adjacency structure. For example, executing the graph algorithm may require forward adjacent vertices, backward adjacent edges, a vertex dictionary, and/or an attributes dictionary. Thus, the adaptable adjacency structure 300, the adaptable adjacency structure 310, the adaptable adjacency structure 320, and/or the adaptable adjacency structure 330 may include all of the data required to execute the graph algorithm. Accordingly, the database management system 110, for example, the graph data engine 114, may execute the graph algorithm by reusing the adaptable adjacency structure 300, the adaptable adjacency structure 310, the adaptable adjacency structure 320, and/or the adaptable adjacency structure 330 as is.

Alternatively and/or additionally, at 405-Y, the database management system 110 may determine that the second portion of the data required to execute the graph algorithm is absent from the existing adjacency structure. As such, at 410, the database management system 110 may modify the existing adjacency structure to include the second portion of the data required to execute the graph algorithm. Moreover, at 412, the database management system 110 may execute, based at least on the modified adjacency list, the graph algorithm. For example, executing the graph algorithm may require backward adjacent edges and/or other data that is absent from the adaptable adjacency structure 300, the adaptable adjacency structure 310, the adaptable adjacency structure 320, and/or the adaptable adjacency structure 330. Thus, in order to execute the graph algorithm, the database management system 110 may modify the adaptable adjacency structure 300, the adaptable adjacency structure 310, the adaptable adjacency structure 320, and/or the adaptable adjacency structure 330 to include the missing data required to execute the graph algorithm.

Figure 5:
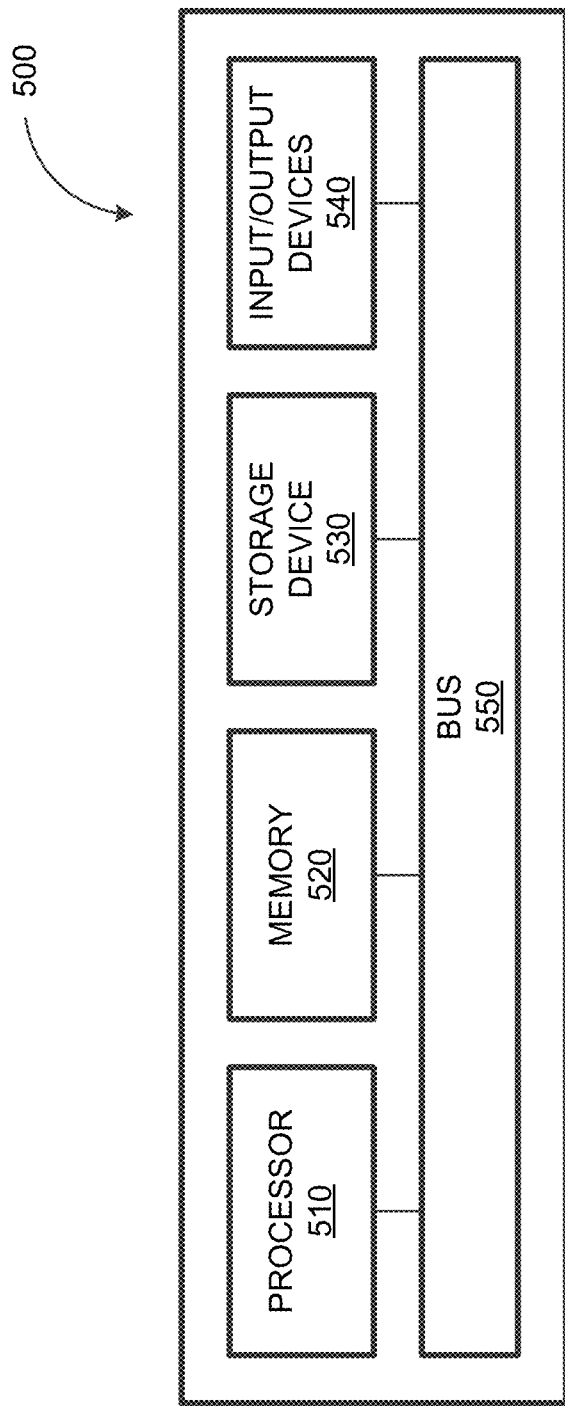
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid state drive, a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, result in operations comprising:
        responding to a request from a client to execute a graph algorithm on graph data stored in a database by at least determining data required to execute the graph algorithm;
        determining a matching adjacency structure does not exist based on at least a first portion of the data required to execute the graph algorithm being absent from a set of existing adjacency structures;
        in response to determining the matching adjacency structure does not exist, determining, from the set of existing adjacency structures, an existing adjacency structure that includes a second portion of the data required to execute the graph algorithm;
        in response to determining the existing adjacency structure that includes the second portion of the data required to execute the graph algorithm, (i) modifying the existing adjacency structure to include the first portion of the data, and (ii) executing, based at least on the modified existing adjacency structure, the graph algorithm, the graph algorithm being executed by at least querying, based on the modified existing adjacency structure, the graph data stored in the database; and
        in response to determining that no existing adjacency structure includes the second portion of the data required to execute the graph algorithm, (i) generating a new adjacency structure to include at least one of a forward adjacent vertex, a forward adjacent edge, a backward adjacent vertex, a backward adjacent edge, a key dictionary, and an attribute dictionary, and (ii) executing, based at least on the new adjacency structure, the graph algorithm.

2. The system of claim 1, further comprising:
    in response to determining that the existing adjacency structure includes all of the data required to execute the graph algorithm, executing, based at least on the existing adjacency structure, the graph algorithm.

3. The system of claim 1, wherein the graph data includes a plurality of vertices, and wherein the graph data further includes one or more edges interconnecting the plurality of vertices.

4. The system of claim 3, wherein the database comprises a relational database that includes a vertex table storing the plurality of vertices and an edge table storing the one or more edges.

5. The system of claim 3, wherein the data required to execute the graph algorithm includes incoming edges into and/or outgoing edges from each of the plurality of vertices.

6. The system of claim 3, wherein the data required to execute the graph algorithm includes one or more vertices that are connected to each of the plurality of vertices by incoming edges and/or outgoing edges.

7. The system of claim 3, wherein each vertex and/or edge is associated with an attribute, and wherein the data required to execute the graph algorithm includes an attribute dictionary enumerating a value for the attribute associated with each vertex and/or edge.

8. The system of claim 3, wherein each vertex and/or edge is associated with a key, and wherein the data required to execute the graph algorithm includes a dictionary mapping the key to a different key assigned to each vertex and/or edge.

9. The system of claim 1, wherein the data required to execute the graph algorithm is determined based at least on a programming code associated with the graph algorithm.

10. A computer-implemented method, comprising:
    responding to a request from a client to execute a graph algorithm on graph data stored in a database by at least determining data required to execute the graph algorithm;
    determining a matching adjacency structure does not exist based on at least a first portion of the data required to execute the graph algorithm being absent from a set of existing adjacency structures;
    in response to determining the matching adjacency structure does not exist, determining, from the set of existing adjacency structures, an existing adjacency structure that includes a second portion of the data required to execute the graph algorithm;
    in response to determining the existing adjacency structure that includes the second portion of the data required to execute the graph algorithm, (i) modifying the existing adjacency structure to include the first portion of the data, and (ii) executing, based at least on the modified existing adjacency structure, the graph algorithm, the graph algorithm being executed by at least querying, based on the modified existing adjacency structure, the graph data stored in the database; and
    in response to determining that no existing adjacency structure includes the second portion of the data required to execute the graph algorithm, (i) generating a new adjacency structure to include at least one of a forward adjacent vertex, a forward adjacent edge, a backward adjacent vertex, a backward adjacent edge, a key dictionary, and an attribute dictionary, and (ii) executing, based at least on the new adjacency structure, the graph algorithm.

11. The method of claim 10, further comprising:
in response to determining that the existing adjacency structure includes all of the data required to execute the graph algorithm, executing, based at least on the existing adjacency structure, the graph algorithm.

12. The method of claim 10, wherein the graph data includes a plurality of vertices, and wherein the graph data further includes one or more edges interconnecting the plurality of vertices.

13. The method of claim 12, wherein the database comprises a relational database that includes a vertex table storing the plurality of vertices and an edge table storing the one or more edges.

14. The method of claim 12, wherein the data required to execute the graph algorithm includes incoming edges into and/or outgoing edges from each of the plurality of vertices.

15. The method of claim 12, wherein the data required to execute the graph algorithm includes one or more vertices that are connected to each of the plurality of vertices by incoming edges and/or outgoing edges.

16. The method of claim 12, wherein each vertex and/or edge is associated with an attribute, and wherein the data required to execute the graph algorithm includes an attribute dictionary enumerating a value for the attribute associated with each vertex and/or edge.

17. The method of claim 12, wherein each vertex and/or edge is associated with a key, and wherein the data required to execute the graph algorithm includes a dictionary mapping the key to a different key assigned to each vertex and/or edge.

18. A non-transitory computer readable medium storing instructions, which when executed by at least one data processor, result in operations comprising:

responding to a request from a client to execute a graph algorithm on graph data stored in a database by at least determining data required to execute the graph algorithm;

determining a matching adjacency structure does not exist based on at least a first portion of the data required to execute the graph algorithm being absent from a set of existing adjacency structures;

in response to determining the matching adjacency structure does not exist, determining, from the set of existing adjacency structures, an existing adjacency structure that includes a second portion of the data required to execute the graph algorithm;

in response to determining the existing adjacency structure that includes the second portion of the data required to execute the graph algorithm, (i) modifying the existing adjacency structure to include the first portion of the data, and (ii) executing, based at least on the modified existing adjacency structure, the graph algorithm, the graph algorithm being executed by at least querying, based on the modified existing adjacency structure, the graph data stored in the database; and in response to determining that no existing adjacency structure includes the second portion of the data required to execute the graph algorithm, (i) generating a new adjacency structure to include at least one of a forward adjacent vertex, a forward adjacent edge, a backward adjacent vertex, a backward adjacent edge, a key dictionary, and an attribute dictionary, and (ii) executing, based at least on the new adjacency structure, the graph algorithm.

* * * * *